H. L. G. MOORE.
EGG HOLDER AND CARRIER.
APPLICATION FILED SEPT. 12, 1913.

1,108,606.

Patented Aug. 25, 1914.
4 SHEETS—SHEET 1.

WITNESSES
Chas. F. Clagett
Bertha M. Allen.

INVENTOR
Herbert L. G. Moore
BY Serrell & Son
HIS ATTORNEYS

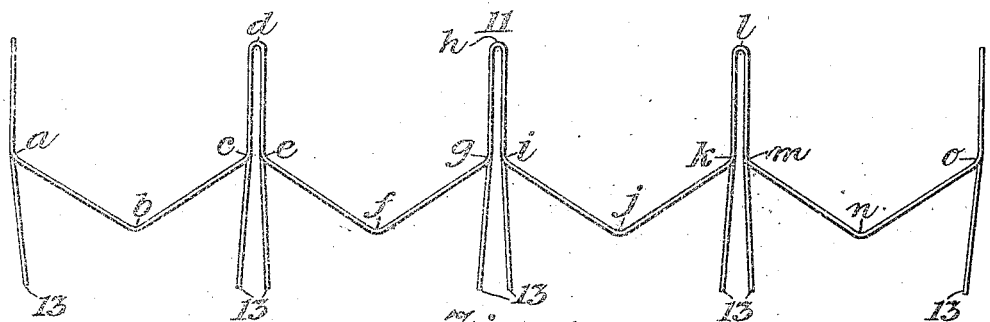
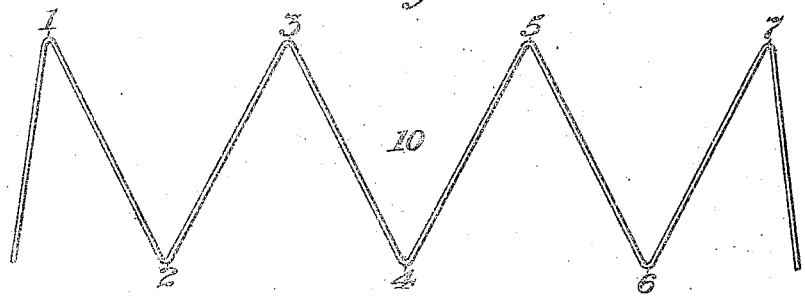
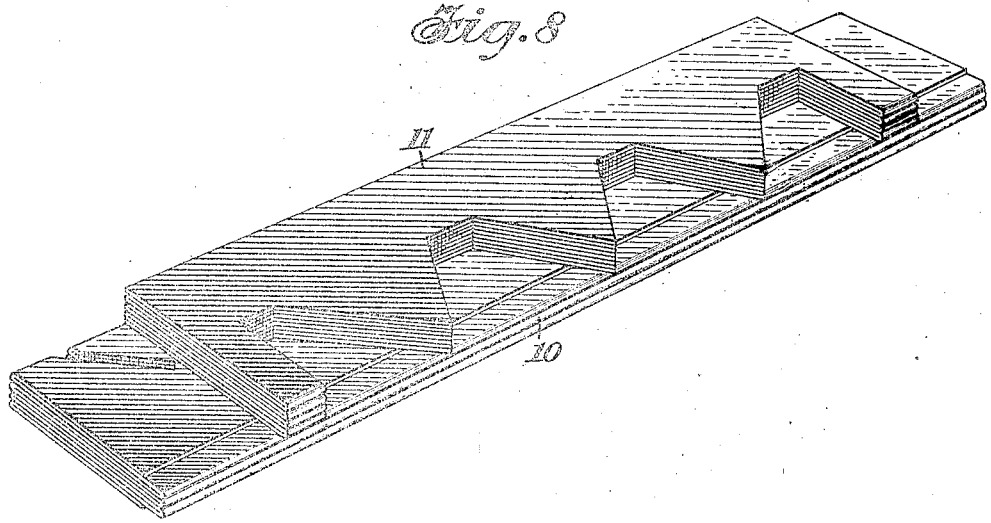

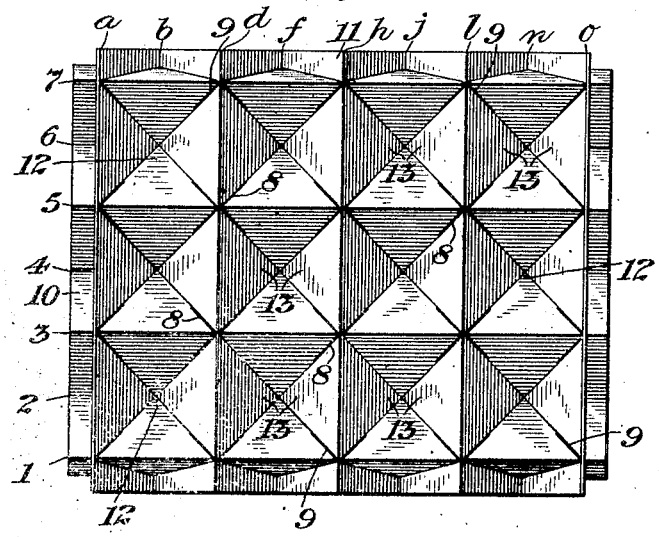
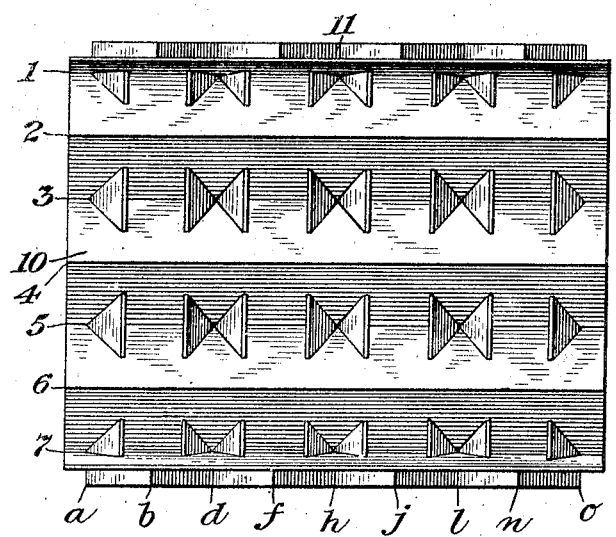

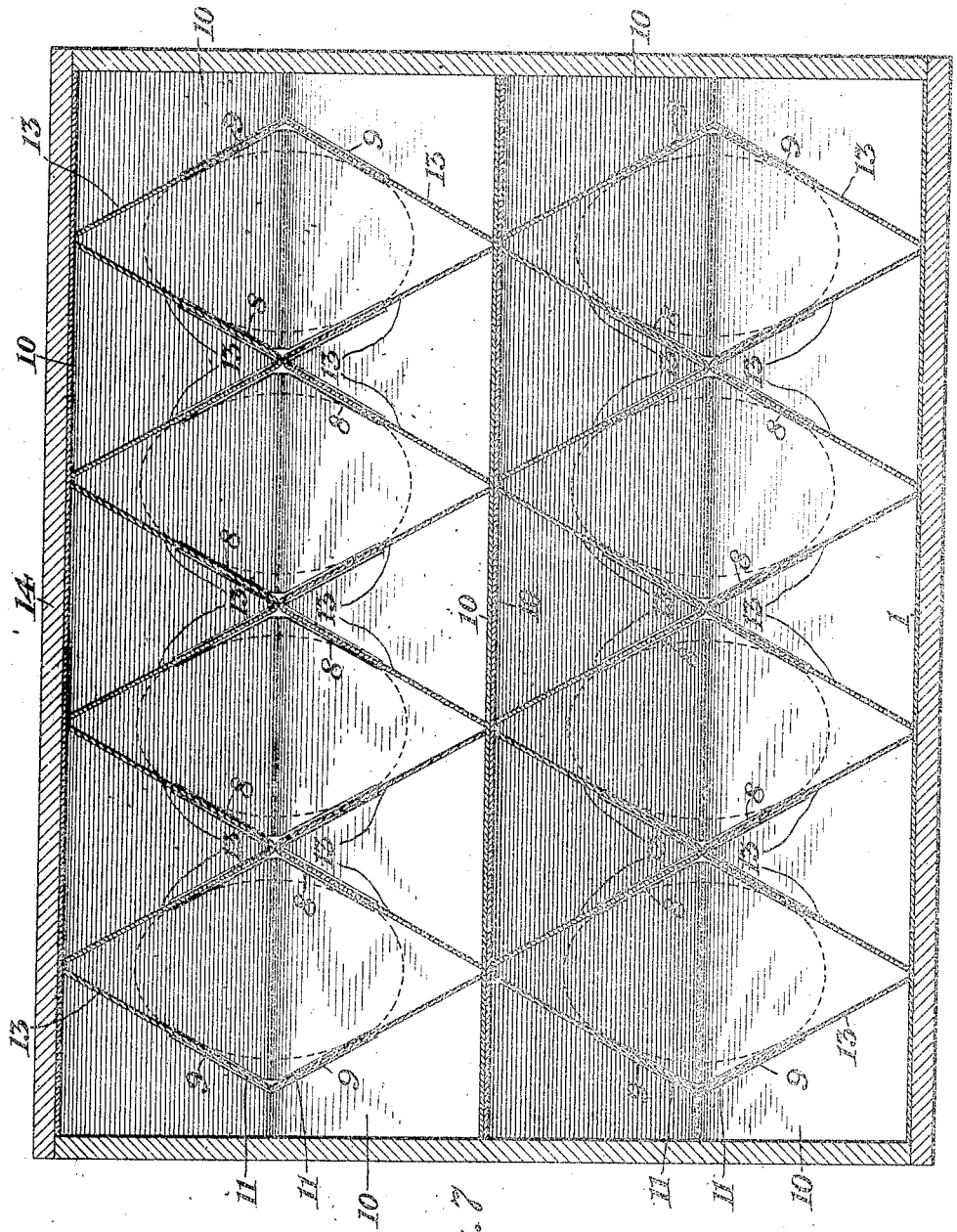

UNITED STATES PATENT OFFICE.

HERBERT L. G. MOORE, OF HOHOKUS, NEW JERSEY.

EGG HOLDER AND CARRIER.

1,108,606.  Specification of Letters Patent.  Patented Aug. 25, 1914.

Application filed September 12, 1913. Serial No. 789,407.

*To all whom it may concern:*

Be it known that I, HERBERT L. G. MOORE, a citizen of the United States, residing at Hohokus, in the county of Bergen and State of New Jersey, have invented an Improvement in Egg Holders and Carriers, of which the following is a specification.

My invention relates to holders and carriers for eggs, and its object is to provide a strong and durable tray in which the eggs may be exhibited and carried about without fear of breakage, or packed to be shipped a distance, the eggs being protected from contact with one another and from injury or breakage should the holder receive a blow or severe jar from contact with some other object, or from carelessness in handling.

It consists of only two members adapted to be connected together in such manner as to form a plurality of adjoining egg receptacles each having four inclined side walls, which are protected on all sides of the tray.

The details of construction and operation of the device are hereinafter more particularly described.

Figure 1:
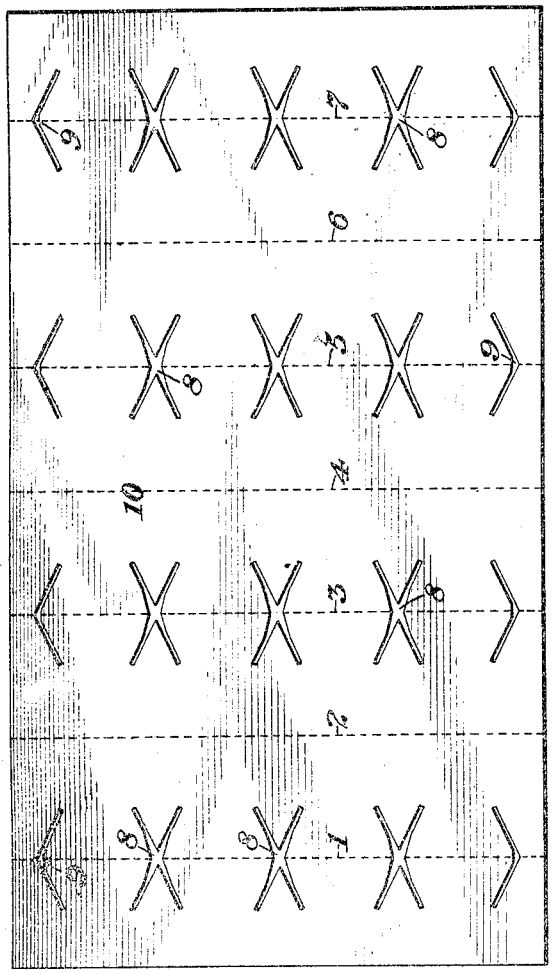
Figure 2:
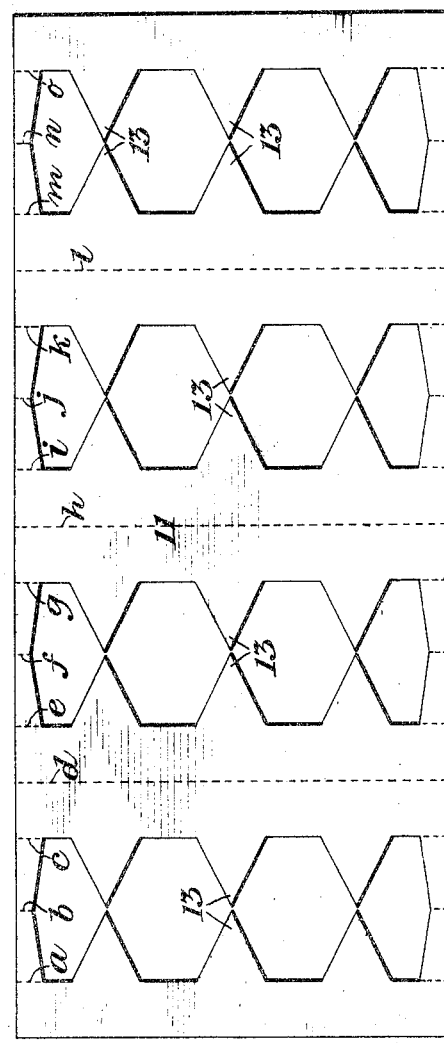

In the accompanying drawing:—Figure 1 is a plan view of the blank from which the bottom of the tray and part of the side walls of each egg receptacle are formed. Fig. 2 is a plan view of the blank from which the top of the tray and the other side walls of the egg receptacles are formed. Fig. 3 is an end view of the top member bent into shape for insertion into the slots of the bottom member. Fig. 4 is an end view of the bottom member bent up into shape to receive the top member. Fig. 5 is a plan view of the two members assembled and forming a complete tray. Fig. 6 is an inverted plan of the same. Fig. 7 is a sectional elevation showing the manner in which the eggs are packed for transportion; and Fig. 8 is a view of both members folded and laid one upon the other.

In Figs. 1, 2, 5 and 6, the parts are shown in half size, while in Figs. 3, 4, 7 and 8, they are shown in full size.

Referring to Figs. 3 and 4, it will be understood that in assembling the two members, the folds in the top member are placed at right angles to the folds in the bottom member.

Similar reference numerals indicate like parts throughout the several views.

Referring to Figs. 1 and 2 of the drawing, 10 and 11 designate two separate blanks of any suitable material such as cardboard from which my improved tray is formed. The blank 10 (Fig. 1) forms the bottom of the tray and two of the inclined walls of each egg receptacle 12. The blank 11 (Fig. 2) forms the top member of the tray and completes the four inclined walls of each egg receptacle when the two blanks are assembled, as shown in Figs. 5 and 6. The surface of the blank 10 is creased or lightly scored on the lines 1, 2, 3, 4, 5, 6, 7, and a series of approximately X-shaped openings 8 are cut out at spaced distances and in parallel rows, and at each end of these rows an obtuse angular slot 9 is cut out at a predetermined distance from the X-shaped openings in line therewith. These slots 9 and also the X-shaped openings 8 are slightly widened at the center to facilitate the assembling of the two members 10 and 11. The surface of the blank 11 is creased or lightly scored on the lines $a, b, c, d, e, f, g, h, i, j, k, l, m, n$ and $o$ and spaced apart in parallel rows, the blank is cut out of a shape to form spaced apart and oppositely projecting V-shaped portions 13 in each row.

When the blank 10 is bent on the creased lines into the shape shown in Fig. 4, the centers of the X-shaped openings will form vertical slots at the tops of the folds each terminating in two diverging slots on the oppositely inclined portions, while the slots 9 will have a similar opening at the top and extend at an inward inclination on the opposite sides of the fold. The blank 10 is now ready to receive the blank 11 and when this blank 11 is bent on its creased lines into the position shown in Fig. 3, it will readily be seen that by inserting those parts between the projecting V-shaped portions into the top slots in the blank 10 and pressing downward upon the top member the opposite sides of each bent over portion of the top member will follow into the diverging slots in the lower member thus causing each pair of the oppositely projecting V-shaped portions 13 of the top member to converge and complete the walls of the egg receptacles 12, when the top member is pushed down to the full extent of the slots in the bottom member. In this position the top edges of the folds in both members are flush with each other. When assembled the ends of each member 10 and 11 project beyond the egg receptacles 12 and on account of their zig-zag formation present a very efficient protection to the receptacles from contact of the sides of the tray with any other object, while the bottom of the tray acts in a similar manner.

The peculiar manner in which the two members 10 and 11 are interlocked forms a very strong division between the egg receptacles 12, and renders it impossible for the egg in one receptacle contacting with an egg in another receptacle, and on account of the converging walls of the egg receptacles, the top, bottom and middle portions of the eggs are out of contact with the walls of the receptacles 12 and each receptacle has a springy or yielding function which provides against danger of breaking the eggs in handling the filled tray.

A box 14 may be provided to receive one or more of the trays, and if only one tray is placed in a box as for the purpose of exhibiting eggs in retail stores, it is not necessary to employ a cover or an inverted tray, and it will be seen that when placed in a box the projecting zig-zag ends of the members 10 and 11 guard the egg receptacles from contact with the inner sides of the box, and the filled trays may be handled without fear of injury to the eggs.

In cases where the eggs are to be delivered, or transported by mail or express, I invert one empty tray over another tray containing the eggs, the pockets or receptacles in the inverted tray being placed directly over and in alinement with the pockets in the filled tray whereby the two trays will each cover one half of the eggs, and any desired number of eggs may be thus packed for shipment in one box. This manner of packing is illustrated in Fig. 7.

These improved trays may be shipped to purchasers in an unfolded condition, the two members shown in Figs. 1 and 2 being laid flat one upon the other, or they may each be folded in the manner shown in Fig. 8; in either case, large quantities may be sent with great economy of space. It is preferable to fold the parts before shipping, as they are then received by the purchasers in a form to be readily assembled without the trouble of first bending them on the creased lines.

I claim as my invention:

1. An egg tray composed of two members interlocked and forming a plurality of adjoining pockets open at the top, each pocket having four converging walls.

2. An egg tray composed entirely of two members interlocked and forming a plurality of adjoining single egg receptacles each having four walls inclined toward one point, substantially on the same plane.

3. An egg tray composed of two folded members interlocked and forming a plurality of adjoining pockets open at the top and each having four converging walls.

4. An egg tray composed of two folded members interlocked at right angles and forming a plurality of adjoining pockets open at the top and each having four converging walls.

5. An egg tray composed of two members only, interlocked at right angles and forming a plurality of adjoining single egg receptacles each provided with four converging walls forming a closed bottom, the ends of said two members being extended in zig-zag form beyond the egg receptacles on the sides and ends of the tray.

6. An egg tray composed of two members, one member having a series of approximately X-shaped openings at spaced apart distances in transverse parallel rows and an obtuse angular slot at each end of each row, said member being bent on the lines of said rows and on lines intermediate thereof into a plurality of longitudinally disposed inclined partitions, the other member being cut out in spaced apart parallel rows to provide spaced apart and oppositely projecting V-shaped portions in each row, said second member being bent on the lines of said rows and on intermediate lines, and the two members interlocked at right angles to each other by inserting those parts of the second member between its projecting V-shaped portions into the openings in the first member whereby a plurality of adjoining egg receptacles are formed.

7. An egg tray composed of two members, one member having a series of approximately X-shaped openings at spaced apart distances in transverse parallel rows, and an obtuse angular slot at each end of each row, said member being bent on the lines of said rows and on lines intermediate thereof into a plurality of longitudinally disposed inclined partitions, the other member being cut out in spaced apart parallel rows to provide spaced apart and oppositely projecting V-shaped portions in each row, said second member being bent on the lines of said rows and on intermediate lines, and the two members interlocked at right angles to each other by inserting those parts of the second member between its projecting V-shaped portions into the openings in the first member whereby a plurality of adjoining egg receptacles closed at the bottom are formed.

8. An egg tray composed of two members, one member having a series of approximately X-shaped openings at spaced apart distances in transverse parallel rows and an obtuse angular slot at each end of each row, said member being bent on the lines of said rows and on lines intermediate thereof into a plurality of longitudinally disposed inclined partitions, the other member being cut out in spaced apart parallel rows to provide spaced apart and oppositely projecting V-shaped portions in each row, said second member being bent on the lines of said rows and on intermediate lines, and the two members interlocked at right angles to each other by inserting those parts of the second member between its projecting V-shaped portions into the openings in the first member whereby a plurality of adjoining egg receptacles with converging walls are formed.

9. An egg tray composed of two members, one member having a series of approximately X-shaped openings at spaced apart distances in transverse parallel rows, and an obtuse angular slot at each end of each row, said member being bent on the lines of said rows and on lines intermediate thereof into a plurality of longitudinally disposed inclined partitions, the other member being cut out in spaced apart parallel rows to provide spaced apart and oppositely projecting V-shaped portions in each row, said second member being bent on the lines of said rows and on intermediate lines, and the two members interlocked at right angles to each other by inserting those parts of the second member between its projecting V-shaped portions into the openings in the first member whereby a plurality of adjoining egg receptacles with converging walls are formed, the ends of said members being extended in zig-zag form beyond the egg receptacles on the sides and ends of the tray.

Signed by me this 10th day of September, 1913.

HERBERT L. G. MOORE.

Witnesses:
BERTHA M. ALLEN,
MARIE D. WOHLERS.